(12) United States Patent
Mak (10) Patent No.: US 6,912,808 B1
(45) Date of Patent: Jul. 5, 2005

(54) FISHING LURE (76) Inventor: Luke Chi Kwong Mak, Units 9 & 10, 7th Floor, Wing Hang Ind. Bldg., 13-29 Kwai Hei St., Kwai Chung, N.T. (HK)

( * ) Notice: Subject to any disclaimer, the term of this patent is extended or adjusted under 35 U.S.C. 154(b) by 0 days.

(21) Appl. No.: 10/195,999

(22) Filed: Jul. 15, 2002

(51) Int. Cl.$^7$ ............................................. A01K 85/00
(52) U.S. Cl. .................. 43/42.28; 43/42.15; 43/42.24; 43/42.33; 43/42.35; 43/42.39; 43/42.47
(58) Field of Search ............................ 43/42.15, 42.09, 43/42.24, 42.28, 42.31, 42.32, 42.33, 42.35, 43/42.47, 42.39

(56) References Cited

U.S. PATENT DOCUMENTS

| 879,869 A | 2/1908 | Hansen | |
| 1,393,617 A | * 10/1921 | Frame | 43/42.47 |
| 2,149,054 A | * 2/1939 | Jones | 43/42.24 |
| 2,596,201 A | * 5/1952 | Bocchino | 43/42.35 |
| 2,716,831 A | * 9/1955 | Glass | 43/42.47 |
| 2,776,518 A | 1/1957 | Felmlee | |
| 2,820,314 A | * 1/1958 | Scott | 43/42.39 |
| 2,932,113 A | * 4/1960 | Dickens | 43/42.35 |
| 3,289,345 A | * 12/1966 | Reininger et al. | 43/42.09 |
| 3,426,467 A | 2/1969 | Bryant | |
| 3,483,651 A | * 12/1969 | Borger | 43/42.39 |
| 3,490,165 A | * 1/1970 | Thomassin | 43/42.09 |
| 3,492,754 A | * 2/1970 | Jentzsch | 43/42.09 |
| 3,611,614 A | 10/1971 | Ward | |
| 3,685,192 A | 8/1972 | Stibbard | |
| 3,735,518 A | * 5/1973 | Kleine et al. | 43/42.15 |
| 3,748,774 A | * 7/1973 | Bryant | 43/42.1 |
| 3,861,073 A | 1/1975 | Thomassin | |
| 3,868,784 A | * 3/1975 | Sabol | 43/42.39 |
| 3,883,979 A | * 5/1975 | Williams, Jr. | 43/42.09 |
| 4,098,017 A | * 7/1978 | Hall | 43/42.35 |
| 4,790,100 A | * 12/1988 | Green, Sr. | 43/42.28 |
| 4,864,766 A | * 9/1989 | Bohn | 43/42.39 |
| 4,893,431 A | * 1/1990 | Ehlers | 43/42.47 |
| 4,942,689 A | * 7/1990 | Link et al. | 43/42.24 |

(Continued)

FOREIGN PATENT DOCUMENTS

FR    1101159 B1 * 10/1955 ................ 43/42.35

(Continued)

Primary Examiner—Darren W. Ark
(74) Attorney, Agent, or Firm—Belasco Jacobs & Townsley, LLP; Norton R. Townsley (57) ABSTRACT A lure comprising: a) a hollow body, made of hard plastic, having a shape approximating the front of a natural fish, and including several ribs with through holes; b) several weights, affixed inside the hollow body; c) a resilient skin, having the shape, texture and coloration of the front of a natural fish and an eye sockets, adhered around the hollow body, around the ribs and through the through holes; d) a resilient tail having the shape, texture and coloration of the tail of a natural fish, integral with the resilient skin; the resilient tail including approximately vertical slits; e) a diving bill affixed to the hollow body just below the nose and protruding through the skin; f) a reflective eye attached to the hollow body within the eye socket; g) a line eye hook, affixed to the hollow body at the nose and protruding through the skin; and h) a fish hook eye hook, affixed to the hollow body underneath and protruding through the skin).

12 Claims, 4 Drawing Sheets

U.S. PATENT DOCUMENTS

| | | | | |
|---|---|---|---|---|
| 4,945,669 A | * | 8/1990 | Webel | 43/42.39 |
| 4,993,183 A | | 2/1991 | Carver | |
| 5,070,639 A | | 12/1991 | Pippert | |
| 5,094,026 A | * | 3/1992 | Correll et al. | 43/42.28 |
| 5,134,801 A | * | 8/1992 | Davey | 43/42.28 |
| 5,182,875 A | * | 2/1993 | Righetti | 43/42.24 |
| 5,193,299 A | * | 3/1993 | Correll et al. | 43/42.47 |
| 5,299,378 A | * | 4/1994 | Ballard | 43/42.15 |
| 5,564,220 A | * | 10/1996 | Blicha | 43/42.32 |
| 5,600,916 A | * | 2/1997 | Smith | 43/42.47 |
| 5,678,350 A | * | 10/1997 | Moore | 43/42.15 |
| 5,815,978 A | * | 10/1998 | Huddleston | 43/42.09 |
| 5,894,693 A | | 4/1999 | Davie | |
| 5,918,405 A | * | 7/1999 | Marusak et al. | 43/42.09 |
| 5,926,993 A | * | 7/1999 | Marusak et al. | 43/42.09 |
| 5,946,848 A | * | 9/1999 | Ysteboe et al. | 43/42.15 |
| 5,956,888 A | | 9/1999 | Vreeland et al. | |
| 6,041,540 A | * | 3/2000 | Potts | 43/42.24 |
| 6,061,948 A | | 5/2000 | Boucek | |
| 6,141,900 A | * | 11/2000 | Rudolph | 43/42.24 |
| 6,182,391 B1 | * | 2/2001 | Hubbard | 43/42.33 |
| 6,266,916 B1 | | 7/2001 | Dugan | |
| 6,301,823 B1 | * | 10/2001 | Monticello et al. | 43/42.09 |
| 6,385,896 B1 | * | 5/2002 | Thomassin | 43/42.03 |
| 6,393,757 B2 | * | 5/2002 | Bomann | 43/42.09 |
| 6,460,286 B1 | * | 10/2002 | Wilson | 43/42.15 |
| 6,618,979 B2 | * | 9/2003 | Wacha | 43/42.47 |
| 2001/0039753 A1 | | 11/2001 | Bomann | |

FOREIGN PATENT DOCUMENTS

| | | | | |
|---|---|---|---|---|
| FR | 2652991 B1 | * | 4/1991 | 43/42.24 |
| FR | 2672773 B1 | * | 8/1992 | 43/42.24 |

* cited by examiner

FISHING LURE

BACKGROUND OF THE INVENTION

The present invention relates to the field of fishing lures and more particularly to lures which look and act like real fish.

Fishing is an activity enjoyed by many as a recreational sport or as commercial enterprise. Sport fisherman or recreational anglers still use the time-proven method of dropping a baited hook attached to a piece of line into the water in the hopes of catching a fish. Through modern advances, anglers now have a wide assortment of equipment with which to find and catch fish.

To encourage the fish to bite, the hook may be baited with a tempting morsel of food such as a live bait fish, live worms, roe or other live bait that is part of the natural diet of the fish species sought by the angler. Anglers also may use a fishing lure which is a manufactured artificial bait that mimics the look and action of the natural bait. Although the dietary choices of most fish can be extremely fickle, part of the attraction of fishing is attempting to discern not only where the fish are located but also the type of bait that the fish are interested in eating. When bait fish are not available to the angler or its use forbidden due to local laws restricting such use, anglers often use fishing lures to catch fish. Fishing lures are used by anglers in both salt water and fresh water.

There is a large variety of lures available to fishermen. A number of them have been patented. The following is a partial listing of U.S. patents and published applications covering various types of lures.

U.S. Pat. No. 879,869 discloses an improvement in fish bait which provides with means whereby the rear end may be oscillated in imitation of the swimming movement of a fish. This is accomplished with a series of vertically divided sections.

U.S. Pat. No. 2,776,518 discloses a fish lure which comprises a molded plastic body, including a head section, an intermediate section and a deformable tail section, having a longitudinal bore there through, a rod extending through the bore, a fishhook secured to the rod at the tail section, a swivel secured to the rod at the head section and a weight embedded within the body.

U.S. Pat. No. 3,426,467 discloses an improved worm or lure attachment. A buoyant head is capped over the leading end of a wriggly imitation plastic worm. A spatulate-shape oblique-angled extension on the head provides a duckbill-like diving vane. The head is provided with an axial bore freely receiving a fishing line or leader which is connected to the eye of a fish hook nested in a socket in the rear end of the head. The shank of the fish hook passes through and out of the leading portion of the imitation worm and the point of the fish hook impales the imitation worm.

U.S. Pat. No. 3,611,614 discloses a fishing lure consisting of an insect-like body member of very soft plastic having the shank portion of a fish hook molded longitudinally therein, the point and eye portions of the hook being laterally offset in the same direction from the shank to project outwardly from the plastic body, and one or more enlargements affixed to the shank and molded in the plastic body, the enlargements serving both as weights to hold the hook in a desired position in use, and to hold the plastic body in secure engagement with the hook.

U.S. Pat. No. 3,685,192 discloses a fish shaped lure of soft resilient plastic with neutral buoyancy imparting means or cavity formed therein. An alternate embodiment has a harder head section and a baffle. There are grooves or slots in the sides of the lure. A line attaching nose wire extends forwardly and a snelled hook is also attached to this nose wire. The snelled hook is detachably held along the underside of the line until a fish strikes whereupon it detaches from the underside so that the strain of the fish is taken directly to the nose wire and hence to the line.

U.S. Pat. No. 3,861,073 discloses an artificial fishing lure for simulating the undulating movement of natural bait. The fishing lure is fabricated of a flexible material, a portion thereof being formed about a weighted member and the shank of a hook. A second portion of the flexible material depends rearwardly substantially circumscribing the hook, the depending portion being substantially in the form of a vertical membrane aligned along the shank of the hook. The depending membrane has its terminus directed toward the head of the fishing lure, the flexibility of the membrane causing the line to horizontally and vertically undulate when the fishing lure is being pulled through water. An alternate embodiment contains vertical slits.

U.S. Pat. No. 4,993,183 discloses banana oil impregnated plastic fishing lures which are provided in various sizes, shapes, colors and resiliency, in order to increase the lure retention time in the mouth of a fish during a strike. In a preferred embodiment the banana oil is impregnated in the plastic fishing lures by mixing the oil into the plastisol while the plastisol is in a liquid state. The concentration of banana oil utilized may be any concentration which is sufficient to impart a banana flavor to the plastic fishing lures. The banana oil may also be added topically to the fishing lures either prior to or after packaging.

U.S. Pat. No. 5,070,639 discloses a fishing lure system comprising a rigid head and a body having a leading surface adjacent the head. The body, preferably flexible, extends rearwardly from the leading surface and removably receives a shank extending rearwardly from the head. The body has a rattle cavity with a mouth opening through the leading surface and offset from the shank. A rattle assembly, preferably longer and wider than it is high, is removably disposed in the cavity. The system may further comprise a different type of lure, such as a spoon-type lure, adapted to removably receive the same rattle assembly which is disposed in the aforementioned cavity.

U.S. Pat. No. 5,894,693 discloses a fishing lure comprising a flexible cylindrical body core coated with a silicone skin. A pair of movable eyes is attached to a forward end of the silicone skin, while paint is placed upon the silicone skin, so as to give the lure an extremely realistic look. It can be assembled as a surface popper, so as to create a surface splashing action in water and as a diver, so as to create a diving, wobbling action in the water.

U.S. Pat. No. 5,956,888 discloses a glitter fishing lure formed from a liquid plastisol in which a vinyl resin has been dispersed in primary and secondary plasticizers. The primary plasticizer is an adipate or phthalate ester, the secondary plasticizer is a hydrocarbon, and the weight ratio of the primary to secondary plasticizer is preferably at least about 1.5, and more preferably about 5.25. The plastisol is heated to at least about its fusion temperature, and shaped in a mold to form a lure body. Once the lure body has cooled and hardened, it has a tacky outer surface. The lure body is agitated in the presence of thermoplastic first glitter flakes under dry conditions, so that the first glitter flakes adhere to the tacky outer surface of the lure body.

U.S. Pat. No. 6,061,948 discloses a mountable head that is adapted to be fitted or coupled to a presently existing or common fishing lure, such as a worm and hook fishing lure or a fly fishing lure. The mountable head comprises a head portion having a hollow receiving chamber and attaching components coupled thereto. The attaching components are depressed or bent inwardly into the receiving chamber so that they are in engaging positions. Various colored eyes are painted on or fixedly attached to different head portions to resemble the heads and eyes of bait animals upon which fish prefer to prey. The attaching components aid in securing the head portion to a fishing lure and further aid in securing the body portion of a soft plastic animal fishing lure in place to a fishing hook, thus preventing the body portion from sliding down the shank of the hook. An eyelet access opening is provided on the head portion to allow access to the eyelet of a fishing lure hook so that a fishing line is able to be attached thereto. The mountable head allows a fishing person or angler to easily alter the appearance and attractiveness of a presently existing or common fishing lure by simply interchanging the mountable head so that the lure has a different head and eye color combination. A weight portion is coupled to the head portion.

U.S. Pat. No. 6,266,916 discloses a fishing lure molded of flexible, translucent, soft plastic material into an integral unit in the form of a baitfish. Pigments, glitter, scent and flavor additives are mixed with the plastic during manufacture to create realistic visual, smell and taste characteristics. A wide gap offset fish hook is removably attached and substantially hidden in the lure by a hook slot in the lower longitudinal edge of the lure, and by an internal chamber. The internal chamber further serves to allow the body of the lure to collapse when attacked by a fish, exposing the point of the hook, as well as to conceal tube weights, flotation inserts, trap air contributing to the buoyancy and upright positioning of the lure, and to act as a reservoir for liquid fish attractant. The buoyancy and sink rate of the lure can be manipulated by utilizing various combinations of hook sizes, tube weight sizes, and flotation inserts positions into the internal chamber. Realistic movement of the lure is attained through the buoyancy and flexibility of the plastic material, the hydrodynamics of the design, and through rod, reel and fishing line manipulation by the angler.

U.S. Pub. No. 2001/0039753 discloses a combination fishing lure comprising a common lure and jacket. The removable jacket is a highly elastic covering molded into a seamless, elongated shell that is stretchable over the lure. The thickness of the jacket provides a natural flesh-like texture to wood, hard plastic or metal lures while protecting the lure from scratches caused by fish strikes or by collision with other objects. The jacket has a cavity with at least a first opening providing access to the cavity. The lure is removably positioned in the cavity of the jacket by stretching the jacket in the region surrounding the opening until it is large enough to insert the lure. The jacket may include a rearwardly projecting tail portion that changes the appearance of the lure by increasing the overall length of the lure and that moderates the erratic wobble of the lure creating a realistic undulating swimming action.

It is believed that common attributes of a successful lure are its coloration, size, appearance and swimming action. With respect to the coloration of a lures, one skilled in the art will appreciate that, with use, the decals or the painted design of a lures often become scratched from collisions with other items in the angler's tackle box, with items under water such as rocks, submerged logs or other such debris or from repeated strikes by fish attracted by the lure. The brightness of the painted design may also fade after extended use in water and exposure to sunlight. With continued use, such lures may tend to lose their effectiveness resulting in fewer and fewer strikes over a given period of time because fish tend to avoid lures that appear unattractive or unappealing as food.

At times the water conditions may make it difficult for fish to locate bait because of, for example, darkness or murky water conditions. When this occurs, anglers may need to fish with a lure that has a metallic or shiny finish or that is fluorescent so as to increase visibility of the lure in the water.

With respect to the swimming action of a lure, it is desirable for action of the lure to closely mimic the undulating side-to-side motion of a natural bait fish. However, most lures have an erratic side-to-side action or wobble significantly different from the natural motion of a bait fish. Accordingly, it is desirable to modify the motion of a lure such that it has a fluid, undulating side-to-side motion of a bait fish as it is cranked in by the angler.

Another problem that arises with many lures is that even though the body design closely duplicates the natural bait which the lure is intended to replace, fish often hit the bait but do not strike to the degree necessary to permit the angler to set the hook and catch the fish. One reason for this is that fish have sensitive mouths and are able to discern that the texture of the lure is hard and unfamiliar. Having tasted the bait, fish lose interest and move on to seek other bait. It would be to the angler's benefit to present a lure that has both the swimming action of a natural fish as well as the texture and taste that more closely simulates fish flesh than does a wood, metal or hard plastic lure or a lure having a cloth covering.

Development of a lure which has the swimming action and texture of a natural fish as well as the looks of a real fish represents a great improvement in the field of angling and satisfies a long felt need of the angler.

SUMMARY OF THE INVENTION

To overcome the limitations associated with prior art lures described above, the present invention discloses a lure which has the swimming action and texture of a natural fish as well as the looks of a real fish. The lure comprises:

a. a hollow body, made of hard plastic, having a shape approximating the front of a natural fish, and including several ribs with through holes;

b. one or more weights, affixed inside the hollow body;

c. a resilient skin, having the shape, texture and coloration of the front of a natural fish and an eye sockets, adhered around the hollow body, around the ribs and through the through holes;

d. a resilient tail having the shape, texture and coloration of the tail of a natural fish, integral with the resilient skin; the resilient tail including approximately horizontal slits;

e. a diving bill affixed to the hollow body just below the nose and protruding through the skin;

f. a reflective eye attached to the hollow body within the eye socket;

g. a line eye hook, affixed to the hollow body at the nose and protruding through the skin; and h. a fish hook eye hook, affixed to the hollow body underneath and protruding through the skin.

The resilient plastic provides a natural flesh-like texture to the lure while protecting it from scratches caused by fish strikes or by collision with other objects. The horizontal slits in the tail section permit the lure to simulate the undulating, side-to-side motion of a natural fish. The hollow body provides buoyancy while the weights ensure that the lure floats level. The diving bill makes the lure dive as it is pulled through the water. The hollow body, skin and tail are preferably translucent and may be painted to simulate the coloration of a natural fish. Optionally, the hollow body may be coated with a material which makes it iridescent.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
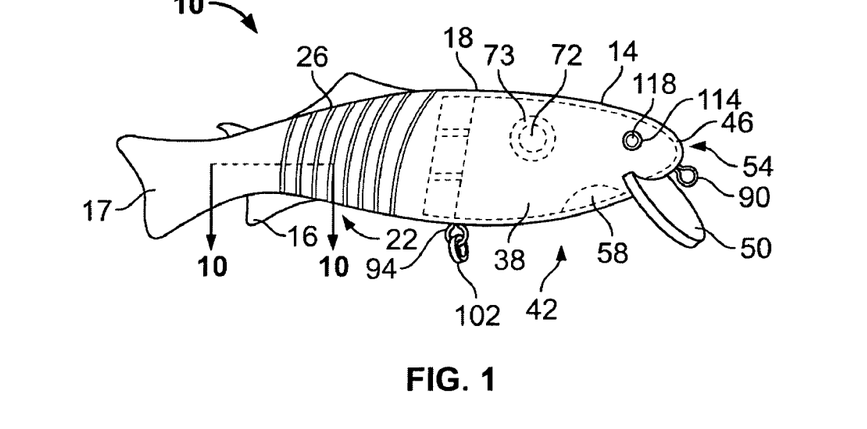
FIG. 1 is a side view of the lure of this invention.
Figure 2:
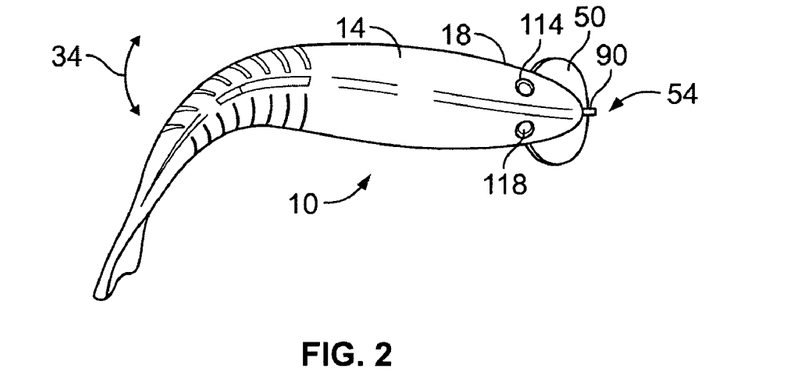
FIG. 2 is a top view of the lure of this invention.
Figure 10:
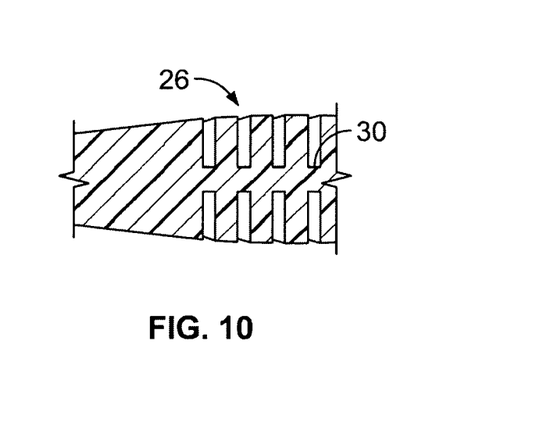
FIG. 10 is a partial cross sectional view along the lines 10—10 of FIG. 1.

FIG. 1 is a side view of the lure 10 of this invention. The outer portion 14 comprises a resilient plastic with the shape, texture and coloring of a natural fish. Preferably the outer portion 14 is translucent. The shape includes fins 16 and a tail 17. The resilient plastic simulates the texture of real fish flesh. The exterior surface 18 of the outer portion 14 is imprinted with markings that simulate scales, rays, lateral lines, opercula, gill slits, the premaxilla and the mandible. The tail section 22 includes a series of approximately vertical slits 26. FIG. 10 is a cross sectional view of one of these slits 26 showing that the slit has a flat bottom 30. In this context "approximately vertical" means closer to the vertical than to the horizontal. The combination of the resilient plastic and the slits 26 allows the lure 10 to closely mimic the undulating side-to-side motion of a natural fish. See FIG. 2 where the arrow 34 illustrates the desired undulating side-to-side motion. Preferably the resilient plastic is highly plasticized polyvinyl chloride (PVC) but any one of a number of resilient plastics, such as silicones or polyurethanes, could be used. Also, the resilient plastic can be impregnated with flavors, colors and glitter as described in some of the prior art listed above.

Figure 3:
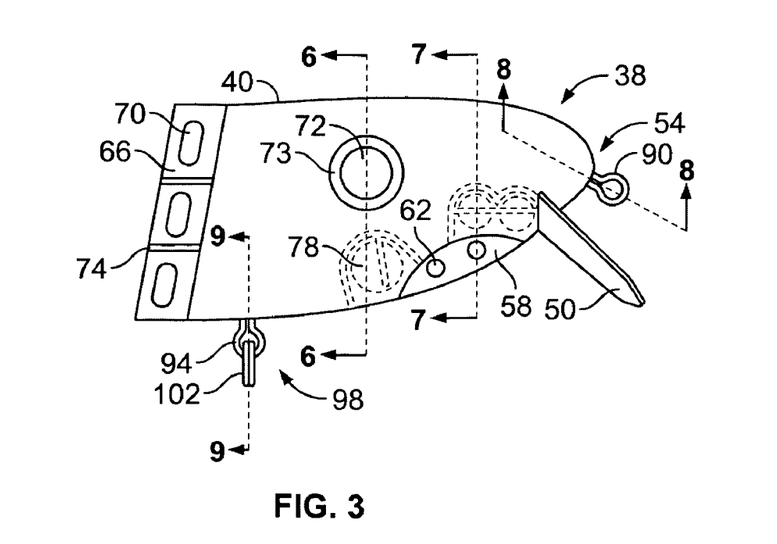
FIG. 3 is a side view of the hollow body inside the lure of this invention.
Figure 4:
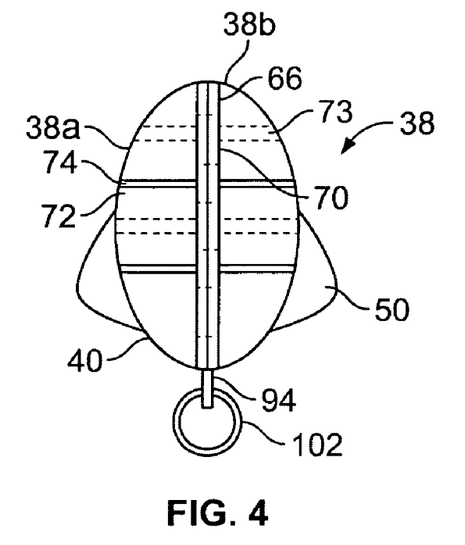
FIG. 4 is an end view of the hollow body shown in FIG. 3.
Figure 5:
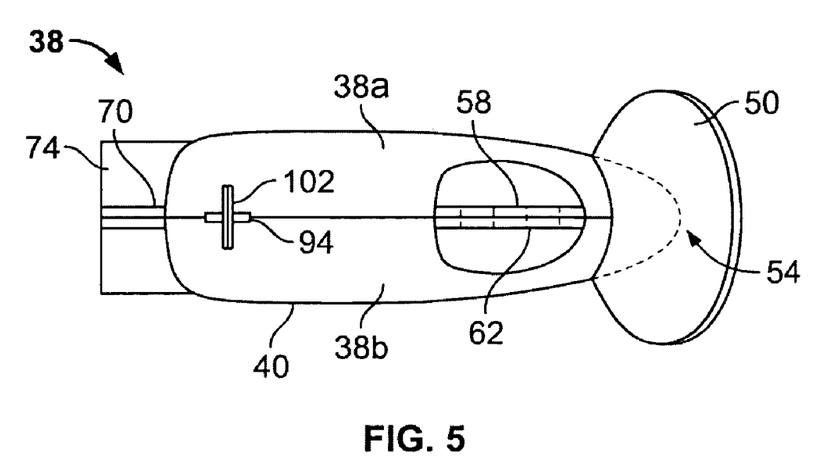
FIG. 5 is a bottom view of the hollow body shown in FIG. 3.

Inside the front of the lure 10 is a hollow body 38 having a shape approximating the front of a natural fish. In this context "approximating" means of similar shape to but smaller than. The purpose of the hollow body 38 is to provide buoyancy to the lure 10. In the front section 42 of the lure 10 the resilient plastic forms an adherent skin 46 over the hollow body 38. In the tail section 22 of the lure 10, the resilient plastic is solid. The construction of the hollow body 38 is best seen in FIGS. 3, 4 and 5. The hollow body 38 includes a forwardly and downwardly protruding bill 50 near the nose 54. The bill 50 is preferably made integral with the hollow body 38 but could be affixed in a subsequent operation. The purpose of the bill 50 is to make the lure 10 dive as it is pulled through the water. The hollow body 38 also includes a front thinned down rib section 58 with through holes 62 and a rear thinned down rib section 66 with through holes 70. It may also include an intermediate through hole 72 with a surrounding cylindrical wall 73. The rear section 66 maybe reinforced with transverse ribs 74. The purpose of these sections 58, 66 and the holes 62, 70, 72 is to provide additional mechanical attachment between the resilient plastic skin 46 and the hollow body 38 as will be further explained below.

Figure 6:
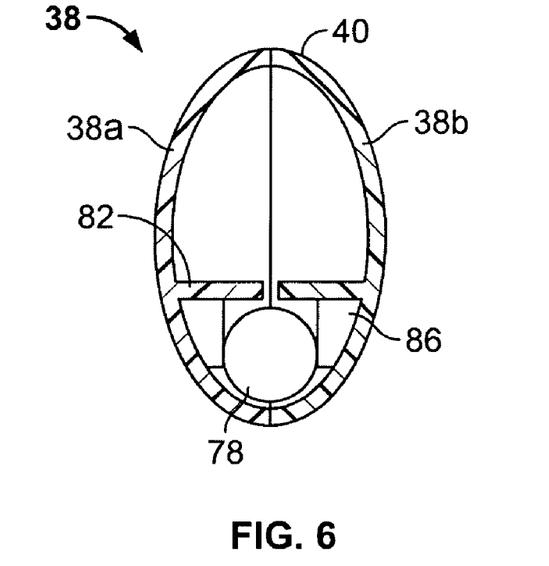
FIG. 6 is a cross-sectional view of the hollow body along the lines 6—6 of FIG. 3.
Figure 7:
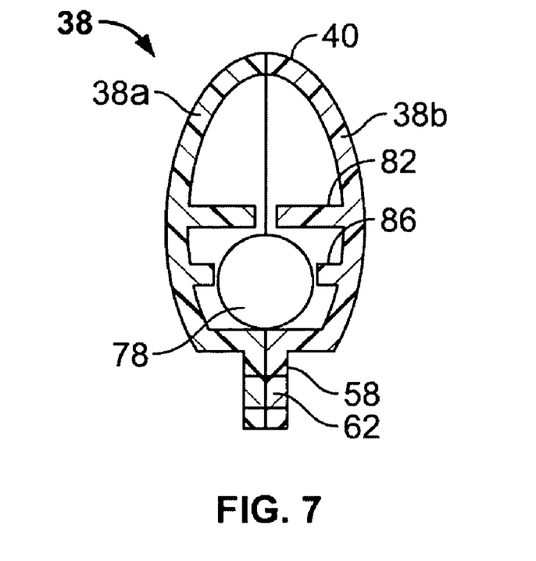
FIG. 7 is a cross-sectional view of the hollow body along the lines 7—7 of FIG. 3.

Trapped inside the hollow body 38 are one or more weights 78. Preferably the weights 78 are made of tungsten but many other metals could obviously be utilized. The purpose of the weights is to ensure that the lure floats horizontally like a natural fish that is alive and not head up or down like a dead or dying fish. Thus the weights 78 are sized and located in order to achieve this purpose with a particular lure 10 design. The preferred means for retaining the weights 78 is shown in FIGS. 6 and 7. The vertical movement of the weights 78 is restrained via upper internal ribs 82 while the sideways movement of the ribs is restrained by intermediate internal ribs 86. It will be clear to those who are most familiar with the art to which this invention pertains that other means for trapping the weights 78 inside the hollow body 38 at the proper position to achieve proper horizontal floating can be employed.

Figure 8:
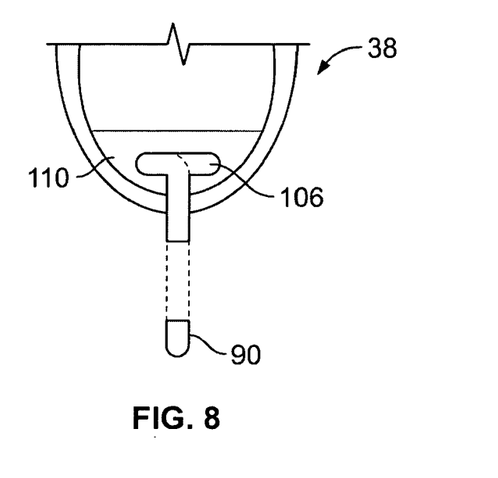
FIG. 8 is a partial cross-sectional view of the hollow body along the lines 8—8 of FIG. 3.
Figure 9:
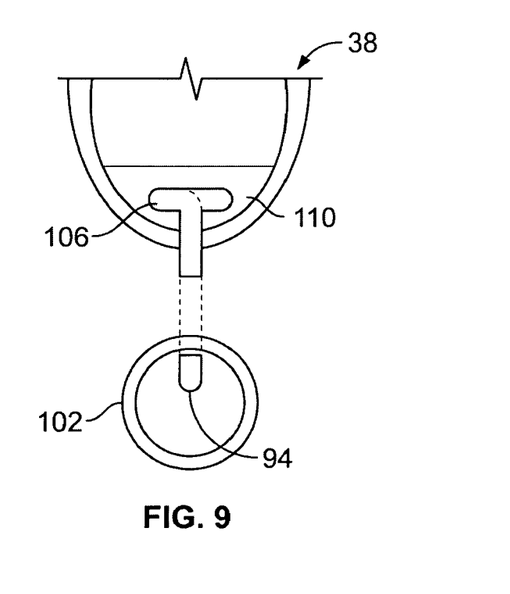
FIG. 9 is a partial cross-sectional view of the hollow body along the lines 9—9 of FIG. 3.

In addition, one or more eye hooks 90, 94 are attached to the hollow body 38. Preferably, a first eye hook 90 is attached at the nose 54 and a second eye hook 94 underneath 98. The purpose of these eye hooks 90, 94 is to enable later attachment of fishing line and fishing hooks to the lure 10. Clearly, the fishing line should be attached to the nose eye hook 90 while the fishing hook should be attached to the underneath eye hook 94, preferably via a split ring 102 in conventional manner. The manner of attachment of the eye hooks 90, 94 is further illustrated in FIGS. 8 and 9. The eye hooks 90, 94 are typically made of bent metal wire in conventional manner. Opposite the eye, the wire is bent transversely in separate directions to form a pair of anchor feet 106. The inside of the hollow body 38 at this point is shaped with reinforcing webs 110 to receive these feet. In this manner the eye hooks 90, 94 are strongly attached to the hollow body 38. Those familiar with the art to which this invention pertains will recognize that alternate means of attachment of the eye hooks 90, 94 to the hollow body 38 may be devised and employed.

In contrast to the outside 14 of the lure 10, the hollow body 38 made of hard material preferably plastic. The preferred plastic is PVC with a low percentage of plasticizer but a variety of other plastics such as polycarbonate, polyethylene and polypropylene could easily be used. The hollow body 38 can be made clear or any desirable color. It can be painted to resemble the coloration of a real fish. Optionally it can be coated with a material that will render it iridescent. Such materials are well known in the art and are typically made of electro coated polyester sheet.

The skin 46 is fabricated with eye sockets 114, penetrating all the way to the plastic of the hollow body 38, into which reflective artificial eyes 118 may be affixed. In other words the eyes 118 are affixed directly to the hollow body 38. Reflective eyes 118 are well known in the lure arts. The purpose of the eyes 118 is to make the lure 10 look even more like a real fish and to reflect light to better attract game fish.

The preferred materials of construction lend themselves to fabrication by injection molding. Therefore, the preferred method of fabrication follows the following steps:

a. Moulding right 38*a* and left 38*b* hand body halves with all the features of construction identified above and on the Figures from hard plastic.

b. Assembling the right hand body half 38*a* to the left hand body half 38*b* while trapping the weights 78 and the eye hooks 90, 94 to create the hollow body 38 incorporating the internal balancing weights 78, and protruding eye hooks 90, 94.

c. If desired, spraying a color on the outside surface 40 of the hollow body 38 or coating the outside surface with an iridescent material.

d. Placing the hollow body 38 inside a mould having the shape and texture of the desired fish. The mold is designed to produce eye sockets 114, slits 26 in the tail section and markings that simulate scales, rays, lateral lines, opercula, gill slits, the premaxilla and the mandible.

e. Injection moulding a resilient material into the mould. This adheres a resilient skin 46 having the shape and texture of the front of a natural fish, but having eye sockets 114, around the hollow body 38, around the ribs 58, 62 and through the through holes 62, 70, 72; and forms a resilient tail 22 having the shape and texture of the tail of a natural fish, with approximately horizontal slits 26, integral with the resilient skin 46. The diving bill 50 and eye hooks 90, 94 protrude through the resilient skin 46. Injection moulding is a well known process.

f. Spraying the resilient skin 46 and tail 22 to resemble the coloration of a natural fish.

g. Affixing reflective eyes 118 to the hollow body through the eye sockets.

The Following Reference Numerals are used on FIGS. 1 Through 10:

10 Lure
14 Outside of lure
16 Fin
17 Tail
18 Surface of lure
22 Tail section of lure
26 Slit in tail section
30 Flat bottom of slit
34 Undulating motion
38 Hollow body
42 Front section of lure
46 Skin over front section
50 Diving bill
54 Nose
58 Front rib
62 Hole through front rib
66 Rear rib
70 Hole through rear rib
72 Intermediate through hole
73 Cylindrical wall of intermediate through hole
74 Transverse reinforcing rib
78 Weight
82 Upper rib
86 Intermediate rib
90 Front eye hook
94 Underneath eye hook
98 Underneath area of hollow body
102 Split ring
106 Anchor foot
110 Internal reinforcing web Thus, the present invention has been described herein with reference to a particular embodiment for a particular application. Those having ordinary skill in the art and access to the present teachings will recognize additional modifications, applications and embodiments within the scope thereof. In particular this invention is not limited to the particular species of fish illustrated but can be applied to any species of fish that is commonly used as a bait fish. This will affect the final look and some of the design features of the lure 10 but not the general design and method of fabrication.

It is therefore intended by the appended claims to cover any and all such applications, modifications and embodiments within the scope of the present invention.

What is claimed is:

1. A fishing lure comprising:

a. a hollow body means having a shape approximating the front of a natural fish; said hollow body means providing buoyancy to said lure; said hollow body means being hard;

b. a leveling means, affixed inside said hollow body means, for enabling said lure to float level;

c. a resilient skin, having the shape, texture and coloration of the front of a natural fish and having an eye socket, and being adhered around said hollow body means;

d. a resilient tail having the shape, texture and coloration of the tail of a natural fish, integral with said resilient skin;

e. said resilient tail including an undulating means to make said lure closely mimic the undulating, side-to-side motion of a natural fish;

f. a diving means, affixed to said hollow body means and protruding through said skin, for causing said lure to dive when pulled through the water;

g. a reflective eye attached to said hollow body within said eye socket;

h. an attachment enhancing means for enhancing mechanical attachment between said hollow body means and said resilient skin;

i. a line attachment means, affixed to said hollow body means and protruding through said skin for attachment of a fishing line; and j. a hook attachment means, affixed to said hollow body means and protruding through said skin for attachment of a fishing hook.

2. A fishing lure as claimed in claim 1 in which said texture includes markings that simulate scales, rays, lateral lines, opercula, gill slits, a premaxilla and a mandible.

3. A fishing lure as claimed in claim 1 in which said resilient tail and skin are impregnated with a flavor.

4. A fishing lure as claimed in claim 1 in which said resilient tail and skin are impregnated with color.

5. A fishing lure as claimed in claim 1 in which said resilient tail and skin are impregnated with glitter.

6. A fishing lure as claimed in claim 1 in which said hollow body means is coated with an iridescent material.

7. A fishing lure comprising:

a. a hollow body having a shape approximating the front of a natural fish, having a nose; said hollow body being hard and including a rib with a through hole;

b. a weight, affixed inside said hollow body;
c. a resilient skin, having the shape, texture and coloration of the front of a natural fish and having an eye socket, and being adhered around said hollow body, around said rib and through said through hole;
d. a resilient tail having the shape, texture and coloration of the tail of a natural fish, integral with said resilient skin; said resilient tail including an approximately vertical slit;
e. a diving bill affixed to said hollow body just below said nose and protruding through said skin;
f. a reflective eye attached to said hollow body within said eye socket;
g. a line eye hook, affixed to said hollow body at said nose and protruding through said skin; and
h. a fish hook eye hook, affixed to said hollow body underneath and protruding through said skin.

8. A fishing lure as claimed in claim 7 in which said texture includes markings that simulate scales, rays, lateral lines, opercula, gill slits, a premaxilla and a mandible.

9. A fishing lure as claimed in claim 7 in which said resilient tail and skin are impregnated with a flavor.

10. A fishing lure as claimed in claim 7 in which said resilient tail and skin are impregnated with color.

11. A fishing lure as claimed in claim 7 in which said resilient tail and skin are impregnated with glitter.

12. A fishing lure as claimed in claim 7 in which said hollow body is coated with an iridescent material.

* * * * *